United States Patent
Amacker et al.

(10) Patent No.: US 10,911,542 B2
(45) Date of Patent: Feb. 2, 2021

(54) SYSTEMS AND METHODS OF INCENTIVIZED DATA SHARING

(71) Applicant: Toyota Research Institute, Inc., Los Altos, CA (US)

(72) Inventors: Matthew Amacker, Santa Clara, CA (US); Julian M. Mason, Redwood City, CA (US); Nikolaos Michalakis, Saratoga, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 99 days.

(21) Appl. No.: 15/936,674

(22) Filed: Mar. 27, 2018

(65) Prior Publication Data

US 2019/0306241 A1 Oct. 3, 2019

(51) Int. Cl.
*H04L 29/08* (2006.01)
*H04L 12/26* (2006.01)
*G06F 16/90* (2019.01)

(52) U.S. Cl.
CPC .............. *H04L 67/12* (2013.01); *G06F 16/90* (2019.01); *H04L 43/08* (2013.01)

(58) Field of Classification Search
None
See application file for complete search history.

(56) References Cited

U.S. PATENT DOCUMENTS

| | | | |
|---|---|---|---|
| 6,741,926 B1 | 5/2004 | Zhao et al. | |
| 7,421,334 B2 | 9/2008 | Dahlgren et al. | |
| 7,430,472 B2 | 9/2008 | Zhao et al. | |
| 2008/0243558 A1 | 10/2008 | Gupte | |
| 2011/0320492 A1 | 12/2011 | Inghelbrecht | |
| 2013/0316311 A1 | 11/2013 | England | |
| 2016/0117921 A1* | 4/2016 | D'Amato | G08G 1/0112 701/117 |

(Continued)

FOREIGN PATENT DOCUMENTS

WO 2011134048 A1 11/2011

OTHER PUBLICATIONS

Ren et al. "SACRM: Social Aware Crowdsourcing with Reputation Management in Mobile Sensing", Computer Communications, vol. 65 No. 7, pp. 55-65, 2015 [retrieved on Sep. 24, 2019]. Retrieved from the Internet: <URL: https://arxiv.org/pdf/1411.7416.pdf>. (Year: 2015).*

(Continued)

*Primary Examiner* — Sm A Rahman
*Assistant Examiner* — Dae Kim
(74) *Attorney, Agent, or Firm* — Christopher G. Darrow; Darrow Mustafa PC

(57) ABSTRACT

Systems and methods of information corroboration are disclosed herein. The systems and methods can include receiving an initial report from at least one detecting party and receiving at least one secondary report from at least one corroborating party. The initial information set and the secondary information set can then be compared and applied to create a reliability factor for the initial information set. The reliability of the initial information set can be determined using the reliability factor; and providing virtual compensation to at least one of the at least one detecting party and the at least one corroborating party, when the initial information set is determined to be reliable.

20 Claims, 6 Drawing Sheets

(56) References Cited

U.S. PATENT DOCUMENTS

2016/0133130 A1\* 5/2016 Grimm .................. H04L 67/22
340/905
2018/0174446 A1\* 6/2018 Wang ................... G08G 1/0112

OTHER PUBLICATIONS

Bhattacharjee, et al. "QnQ: A Reputation Model to Secure Mobile Crowdsourcing Applications from Incentive Losses", 2017 IEEE Conf. on Comm'ns and Network Security, 2017 [retrieved on Sep. 11, 2020]. Retrieved from the Internet: <URL: https://ieeexplore.ieee.org/stamp/stamp.jsp?tp=&arnumber=8228635>. (Year: 2017).\*

Mulyana et al., "Gamification design of traffic data collection through social reporting", Interactive Digital Media (IDCM), 2015 4th International Conference, Dec. 1-5, 2015, 3 pages.

Ryan et al., "Why gamification is serious business", Accenture Outlook, retrieved Nov. 28, 2017, 7 pages.

\* cited by examiner

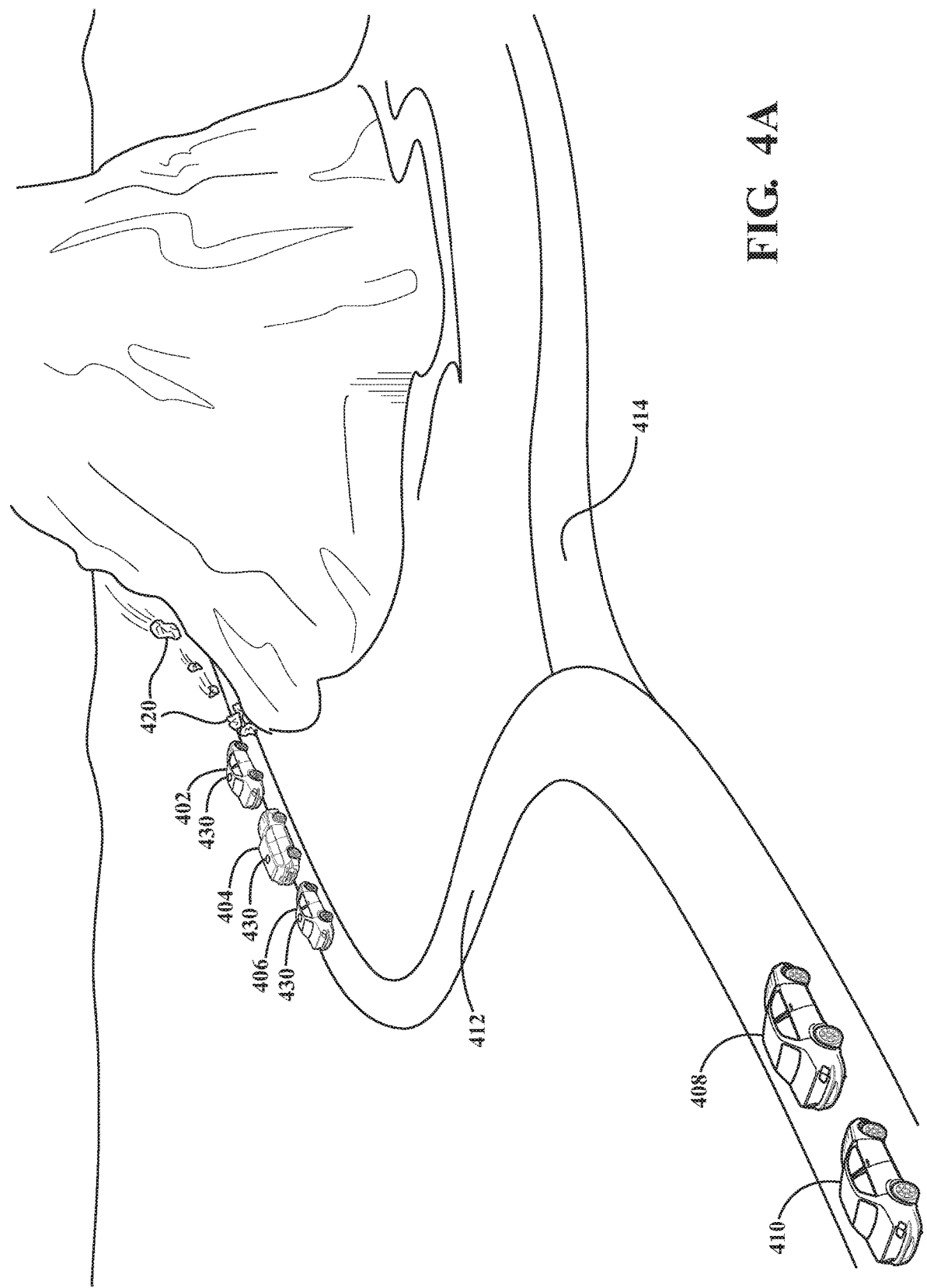

US 10,911,542 B2

SYSTEMS AND METHODS OF INCENTIVIZED DATA SHARING

TECHNICAL FIELD

Embodiments described herein generally relate to systems and methods for incentivized data sharing. More specifically, the embodiments generally relate to systems and methods for data verification including include a reputation system and a currency system.

BACKGROUND

In the near future, there will be many self-driving and automated vehicles on the road. The levels of autonomy are numerous, from modifications of operator behavior and guidance features to fully self-driving vehicles. Vehicles and the systems that perform these autonomous actions, perform based on the information available to the system. To enable that performance, cars can collect data from the environment through sensors and the like. However, sensors can only provide data which is reasonably available to that sensors (e.g., within range of the sensors, of the type detectable by the sensors, etc.) For instance, when a vehicle encounters a pothole, the sensor system can attempt to detect said pothole. However, the sensors only have a limited time frame to detect and accommodate for said pothole, creating room for error.

SUMMARY

Systems and methods for corroboration of reported information are disclosed herein. In one embodiment, an information corroboration system for collecting and assessing information is disclosed. The information corroboration system can include one or more processors; and a memory communicably coupled to the one or more processors. The memory can store a collection module including instructions that when executed by the one or more processors cause the one or more processors to receive an initial report from at least one detecting party, the initial report providing an initial information set for a detectable event, and to receive at least one secondary report from at least one corroborating party, the secondary report providing at least one secondary information set for the detectable event. The memory can further store a comparison module including instructions that when executed by the one or more processors cause the one or more processors to compare the initial information set and the secondary information set, to create a reliability factor for the initial information set using the comparison, and to determine the reliability of the initial report using the reliability factor. The memory can further store a compensation module including instructions that when executed by the one or more processors cause the one or more processors to provide virtual compensation to at least one of the at least one detecting party and the at least one corroborating party, when the initial report is determined to be reliable.

In another embodiment, a non-transitory computer-readable medium for collecting and assessing information is disclosed. The non-transitory computer-readable medium can store instructions that when executed by one or more processors cause the one or more processors to receive an initial report from at least one detecting party, the initial report providing an initial information set for a detectable event. The non-transitory computer-readable medium can further store instructions to receive at least one secondary report from at least one corroborating party, the secondary report providing at least one secondary information set for the detectable event. The non-transitory computer-readable medium can further store instructions to compare the initial information set and the secondary information set. The non-transitory computer-readable medium can further store instructions to create a reliability factor for the initial information set using the comparison. The non-transitory computer-readable medium can further store instructions to determine the reliability of the initial report using the reliability factor. The non-transitory computer-readable medium can further store instructions to provide virtual compensation to at least one of the at least one detecting party and the at least one corroborating party, when the initial report is determined to be reliable.

In another embodiment, a method for collecting and assessing information is disclosed. The method can include receiving an initial report from at least one detecting party, the initial report providing an initial information set for a detectable event. The method can further include receiving at least one secondary report from at least one corroborating party, the secondary report providing at least one secondary information set for the detectable event. The method can further include comparing the initial information set and the secondary information set. The method can further include creating a reliability factor for the initial information set using the comparison. The method can further include determining the reliability of the initial report using the reliability factor. The method can further include providing virtual compensation to at least one of the at least one detecting party and the at least one corroborating party, when the initial report is determined to be reliable.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

FIGS. 4A and 4B depicts a plurality of vehicles incorporating the information corroboration system, according to embodiments described herein.

To facilitate understanding, identical reference numerals have been used, wherever possible, to designate identical elements that are common to the Figures. Additionally, elements of one embodiment may be advantageously adapted for utilization in other embodiments described herein.

DETAILED DESCRIPTION

Embodiments disclosed herein describe information corroboration systems, methods for incentivized data sharing including collection and assessing of user-generated information. The system and methods can include a system of reputation and a system of currency for data sharing. The system of currency can includes earning virtual money for being first to report and corroborating a report. The currency can be usable to purchase advance information on the route it will travel. System of reputation can be earned by truthful reporting and lost by false reporting. The reputation system is intended to be cumulative, with multiple truthful reports and/or multiple false reports being required before any significant reputation shift. The reputation can affect the currency received for reporting and reliability given to the report, including increasing or decreasing the currency received. Embodiments of the present application can be more clearly understood with relation to the figures and the description below.

Figure 1:
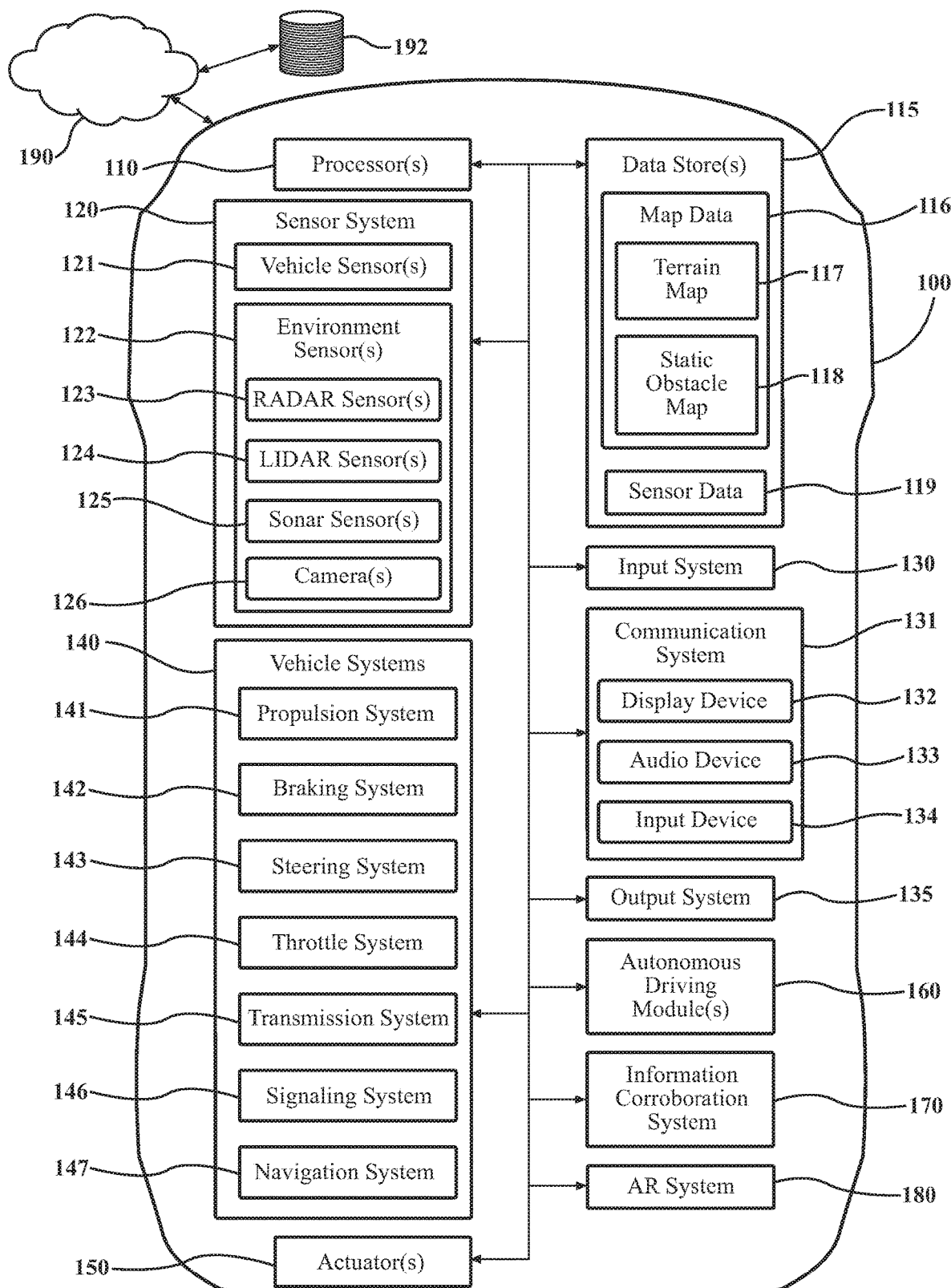
FIG. 1 is a block diagram of a vehicle useable as part of an information corroboration system, according to embodiments described herein.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate autonomously, semi-autonomously, or manually by an in-vehicle operator. The vehicle 100 can include an information corroboration system 170 or capabilities to support an information corroboration system 170, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a more thorough understanding of the embodiments described herein. Those having ordinary skill in the art, however, will understand that the embodiments described herein may be practiced using various combinations of these elements.

Figure 2:
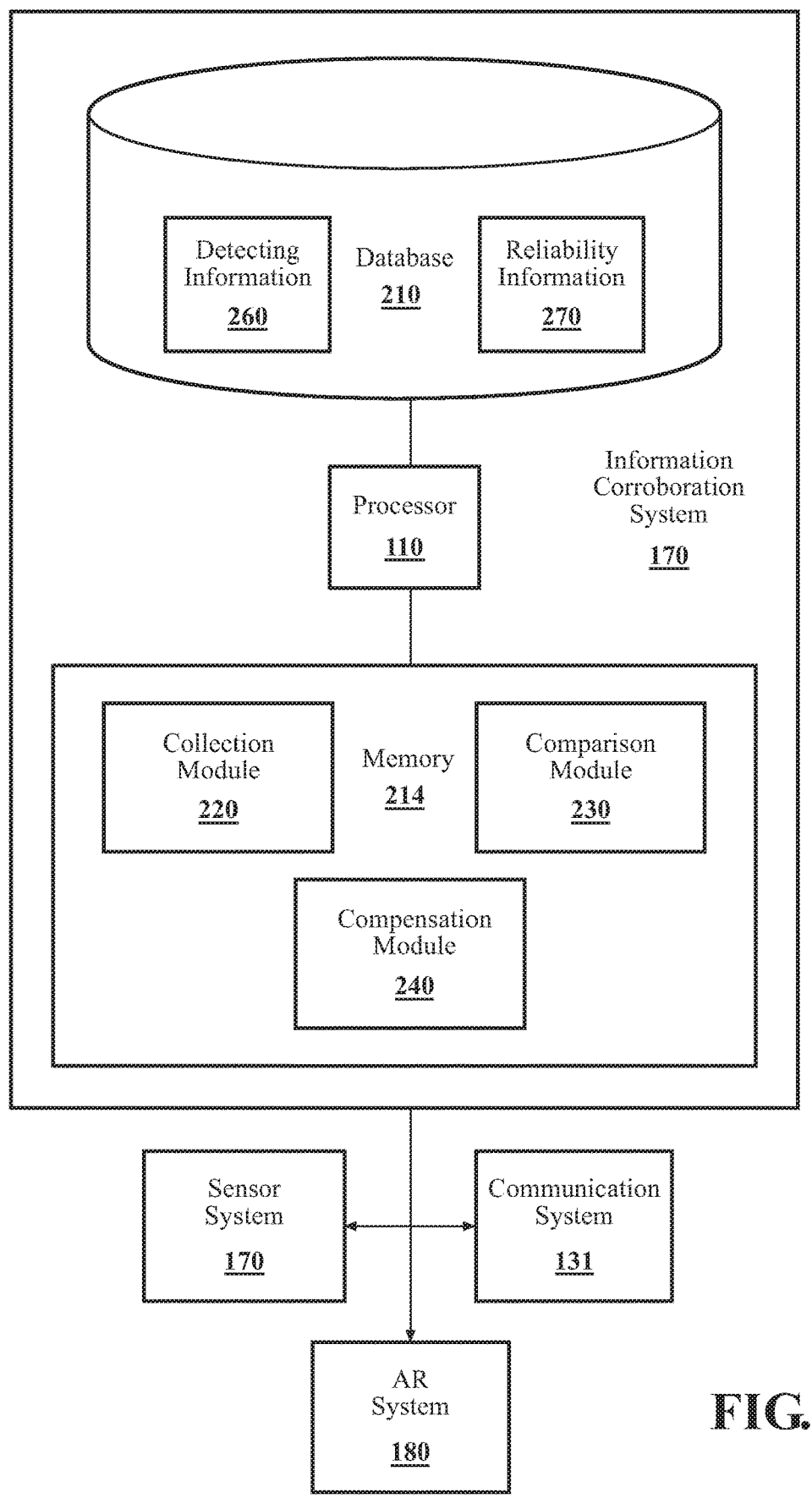
FIG. 2 is an illustration of the information corroboration system for collecting and assessing user-generated information, according to embodiments described herein.

The information corroboration system 170 is more clearly described with reference to FIG. 2. The information corroboration system 170 is shown as including a processor 110 from the vehicle 100, depicted in FIG. 1. Accordingly, the processor 110 can be a part of the information corroboration system 170, the information corroboration system 170 can include a separate processor from the processor 110 or the information corroboration system 170 can access the processor 110 through a data bus or another communication path. In one embodiment, the information corroboration system 170 includes the memory 214 that stores a collection module 220, a comparison module 230 and a compensation module 240. The memory 214 can be a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the processor 110, cause the processor 110 to perform the various functions disclosed herein.

The collection module 220 generally includes instructions that function to control the processor 110 to receive an initial report from a detecting party. The detecting party is the party who made the initial discovery or otherwise made the initial disclosure of a detectable event to the collection module 220. The initial report is a report of information from the detecting party about the detectable event, where a detectable event is an event or occurrence which the detecting party determines is of interest. The detectable event, in a general sense, is an event which drivers or operators of a vehicle would find of value to their driving experience. In one embodiment, the detecting party can report on an active traffic event, such as road debris or a collision, to the collection module 220. The collection module 220 can then coordinate the initial report with any further reports of the same event.

The initial report can include an initial information set for a detectable event, including information on the detectable event. The initial information set is information provided regarding the detectable event, which is derived from the initial report. The initial information set can include location, description of the event, what makes the event notable, guidance for other operators, navigational information, and further details to discern the detectable event. In one embodiment, the initial information set can include the approximate position on a road that an event occurred, the type of event, the timing of the event, and remedial actions being taken.

The initial information set can be stored as part of the detection information 260. The detection information 260 can be stored in a database, such as a database 210. The collection module 220 can receive the detection information 260 from the operator through a communications device. The communications device can be a device such as an audio device, a display device or other forms of communication with the operator or user. In one embodiment, the communications device is an augmented reality (AR) system, such as the AR system 180 described with reference to FIG. 1. One skilled in the art will understand, based on the disclosure herein, the breadth of embodiments which can be incorporated as a communications device using the embodiments described herein.

Further, the collection module 220 can include instructions to receive at least one secondary report from at least one corroborating party. The secondary report is a description of the detectable event which provides additional information about the detectable event. The secondary report can include a secondary information set for the detectable event. The secondary information set can be used to corroborate or deny at least a portion of the initial information set. The corroborating party can include one or more users or operators which can provide information which corroborates the initial information set. The determination of which report is the initial report and which reports become a secondary report can be decided based on a variety of factors, such as timing, reputation, expertise (e.g., certain detectable events can require a specific skill level to be considered an initial detection, such as failing infrastructure), or others.

Though described here as being initiated by the operator or user, the detectable event can be determined by a system, such as the information corroboration system 170. In one embodiment, the collection module 220, through one or more sensors, such as the sensor system 120, determines that a detectable event has occurred. The collection module 220 then, using a communication device, such as the communication system 131 or the augmented reality system 180, reports the possible detectable event to the user or operator. This report prompts the user or operator to provide the initial report, the initial information set and others accordingly. In further embodiments, the determination of the detectable event by the collection module 220 can come from a variety of sources including sensors (either local or remote to the vehicle), media traffic (e.g., internet searches), vehicle traffic, or others which provide an indicia of an occurring detectable event.

The detection information 260 broadly covers information provided about the detectable event from any source, including the detecting party, the corroborating party, independent sources, news sources, and others. The detection information 260 can include location, vehicle data, tangential information provided by the user or operator, type of event, environmental conditions, associated events (e.g., a bridge collapse due to a tanker explosion), and others that may directly or indirectly relate to the detectable event. The detection information 260 can include details about the locations, environmental information, previous detectable events, and others. In one example of a specific road, the detection information 260 can include high traffic times of day, the number of detectable events which have occurred over a period of time, who initiates contact with a detectable event in this location, types of detectable events which have occurred, and possible weather conditions.

The initial information set and the secondary information set can then be forwarded, as part of the detection information 260, to the comparison module 230. The comparison module 230 generally includes instructions that function to control the processor 110 to compare the initial information set and the secondary information set. The initial information set can then be compared to the secondary information set to determine the level of correlation between said information sets. It is understood that information taken from an eyewitness to a detectable event may not be wholly (e.g., poor recall) or even partially accurate (e.g., purposefully inaccurate information). Assuming the initial information set is an accurate representation of the detectable event, the initial information set is expected to correlate at a number of factual locations with the secondary information set. As such, by collecting one or more secondary information sets, the initial information set can be verified in real time. The comparison from the comparison module 230 can include qualitative measurements (e.g., the initial information set is generally accurate) and quantitative measurements (e.g., a percentile of accuracy based on a number of verification points). In further embodiments, the comparison module 230 can compare secondary information sets to one another. In cases of multiple secondary information sets, the secondary information sets can be compared to see if there is outlying data. In this way, the comparison module 230 can remove unreliable secondary information sets and prevent false negatives regarding the initial information set.

The comparison module 230 can further include instructions to create a reliability factor for the initial information set using the comparison. The reliability factor is the measure of how reliable the initial information set is, based on comparison between the initial information set and the secondary information set. The reliability factor can be a quantitative or qualitative measure. The comparison and the reliability factor can be stored in a data store, such as the database 210. In one embodiment, the reliability factor and/or the comparison can be stored as part of the reliability information 270. The reliability information 270 can be a collection of information regarding one or more information sets, regarding the reliability of one or more detecting parties and/or corroborating parties. The reliability information 270 can be stored in a data store, such as the database 210.

The comparison module 230 can further include instructions to determine the reliability of the initial report using the reliability factor. The reliability factor generally relates to how much the detecting party can be trusted. Thus, the reliability factor regarding the initial information set can be applied to the initial report to determine reliability of the information as provided by the detecting party. The reliability factor can be directed to an individual detectable event (e.g., the detecting party provided an initial report which is reliable to some degree as determined from the comparison), cumulative (e.g., based on a number of reports, the detecting party provides information which is reliable to some degree), or combinations thereof.

As above, in further embodiments, the comparison module 230 can determine the reliability of the secondary reports. In the event that enough secondary reports have been received, the comparison module can use other secondary reports to determine if one of the secondary reports is providing poor or false information. The secondary information sets from said secondary report and the other secondary reports can be provided a reliability factor. The secondary reliability factors can then be used to determine the reliability of the secondary reports. In one embodiment, the compensation module further includes instructions to provide negative virtual currency and reduced comparative reliability, when the secondary report is determined to be unreliable. Comparative reliability is the reliability of the secondary report in confirming or denying the initial report.

The compensation module 240 generally includes instructions that function to control the processor 110 to provide virtual compensation to at least one of the at least one detecting party and the at least one corroborating party, when the initial information set is determined to be reliable. Using the established reliability regarding the initial report and/or the secondary reports, the compensation module 240 can compensate the detecting party and/or the corroborating party based on their accuracy. The compensation can be any form of compensation, respective to the value of the information provided. Compensations can include real or virtual currency, reputation, tokens, gifts, tickets, or others. The compensation can include more than one form of compensation, such as both virtual currency and reputation. Reputation is used here to describe the weight that your contributions (either detecting party or corroborating party) will have in the future. In the case of virtual currency, the currency can be used for a variety of benefits such as advance information, upgrades to their vehicle, online game benefits, or others.

In one embodiment, the compensation provided by the compensation module 240 can be tiered. In a tiered compensation model, the compensation can be more for one party than another based on the level of their contribution, such as an initial report being rewarded higher than a secondary report, a report from someone with higher reputation being rewarded more compensation than a report from someone with lower reputation, or others. In one example, the compensation can be higher for the detecting party than for the corroborating parties. In another example, the compensation can be different forms for the detecting party and the corroborating party (e.g., the detecting party receives reputation and actual currency, whereas the corroborating parties receive virtual currency). In further embodiments, the compensation can be positive or negative, based on the contribution from the parties. In one example of negative compensation, if a detecting party submits a false report, the compensation module can deduct virtual currency and give negative reputation.

The compensation from the compensation module 240 can reflect whether the information from the initial or secondary report was either deceptive or truthful. Compensation for positive contributions can generally benefit the contributing party (either detecting party or corroborating party). However, compensation for negative contributions can have a negative effect. In one example, if the detecting party has too much negative reputation, initial reports from said party can require more corroboration before being trusted or reports may not be accepted from that party. In further embodiments, the virtual currency can be used to purchase guidance information for your vehicle. One skilled in the art will understand that there are a variety of compensations schemes which can be modified for or used with disclosed system and methods.

In relation to the compensation, the compensation module 240 can include instructions for exchanging a currency, such as exchanging a currency for information or items of value. The compensation module 240 can include an interface to communicate with the detecting party or secondary party, such as through the communication system 131 or the AR system 180. In one embodiment, the compensation module 240 can communicate with the detecting party through the display device 132. The compensation module 240 can then present a list or display of articles which can be purchased using the compensation.

As such, information regarding compensations and purchases can be collected by the compensation module 240 over time, such that a model can be created. In one embodiment, the compensation module 240 collects information regarding a virtual currency, such that the information corroboration system 170 can determine what the currency is being used on. In another embodiment, the compensation module 240 records reputation over time, such that the information corroboration system 170 can determine a cumulative reputation for each user. In the case of reputation, the reputation can be used to determine the value of reports from the detecting party and/or the secondary party. In the case of virtual currency, the purchase information can be used to determine which forms of compensation are sought after by different demographics or overall.

Figure 3:
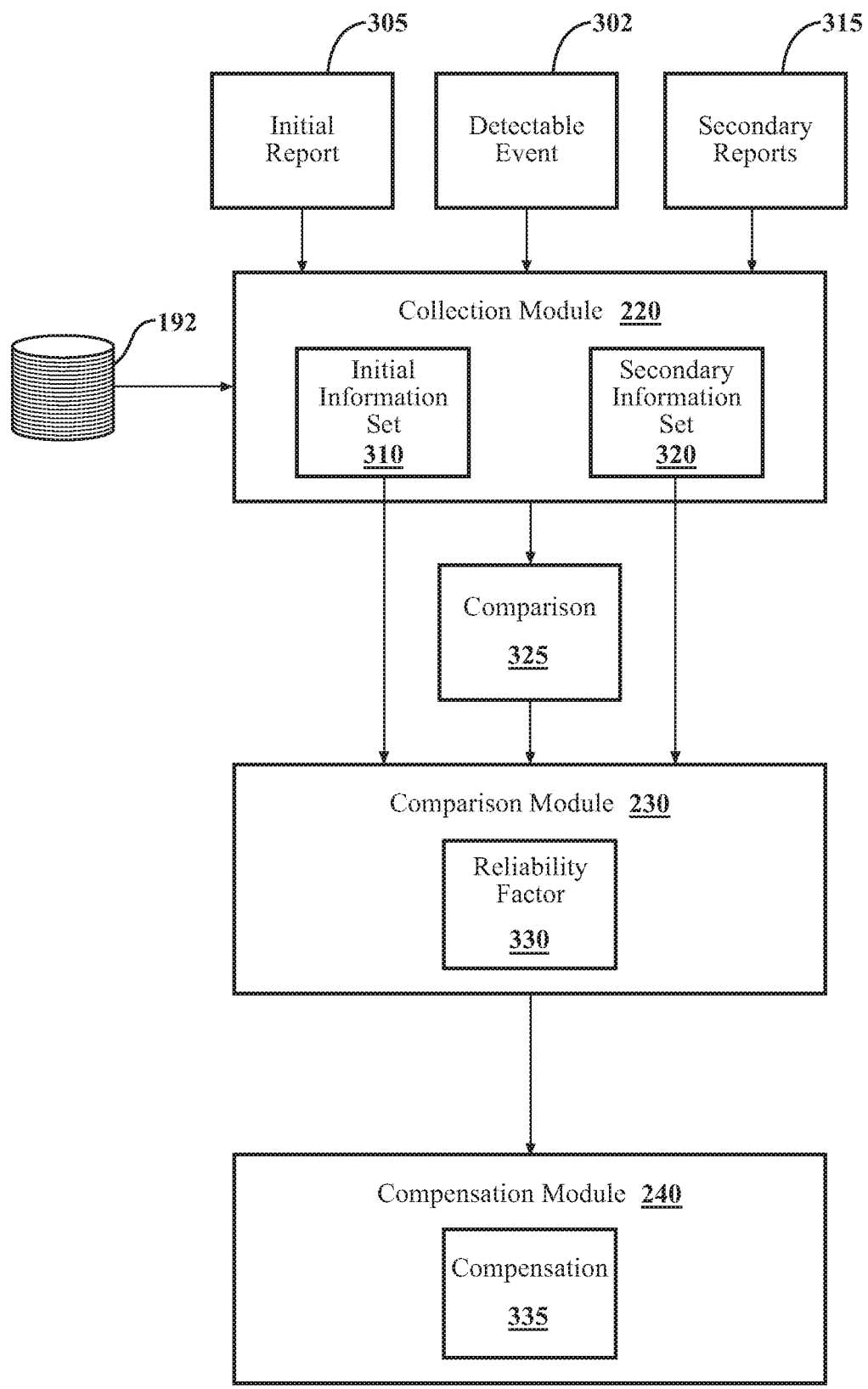
FIG. 3 is a schematic of the information corroboration system, according to one or more embodiments.

FIG. 3 is a schematic of the information corroboration system 170, according to one or more embodiments. The information corroboration system 170 gathers information from a plurality of parties (e.g., the reporting party and the one or more secondary parties). The information corroboration system 170 then determines the reliability of the gathered information based on corroboration of multiple reports. Once the gathered information is corroborated, the information corroboration system 170 can then provide compensation to one or more of the plurality of parties based on timing, reliability and other factors.

The information corroboration system 170 is initiated, through the collection module 220, at the detectable event 302. As above, the detectable event 302 can include any event or occurrence which the drivers or operators of a vehicle would find of value to their driving experience. The detectable event 302 can be noticed by the initial party, the secondary party, the information corroboration system 170, or combinations thereof. The initial party and the secondary party then contribute an initial report 305 and one or more secondary reports 315. The position of the initial party and secondary parties, from the plurality of parties, can be determined by timing. As such, the initial report 305 and the secondary reports 315 can contain substantially similar information regarding the detectable event 302. In the optional case that the information corroboration system 170 notices the detectable event 302, the collection module 220 can then prompt the plurality of parties for a report. The order of response from the plurality of parties can then determine the initial party and the secondary parties respectively.

The collection module 220 can then coordinate the initial report 305 with any secondary reports 315 of the same detectable event 302. It is understood that a plurality of events which could qualify as detectable events 302 can occur at the same general time and location. The collection module 220 can use a variety of information collected about the plurality of parties and the environment to determine which initial report 305 and secondary reports 315 relate to the same detectable events. Information used herein can include word mapping, personality profiles of the plurality of parties, proximity of the vehicles, information communicated by the plurality of parties regarding the event, artificial intelligence schemes, and others.

The collection module 220 can use the initial report 305 and the secondary reports 315 to prepare an initial information set 310 and one or more secondary information sets 320. The number of secondary information sets 320 can correlate with the number of secondary parties and/or secondary reports 315. The initial information set 310 and the secondary information sets 320 can be information and specific data point collected from or based on the initial report 305 and the secondary report 315, respectively. The initial information set 310 and the secondary information sets 320 can include location, type of event, metadata regarding the initial report or the secondary reports, behaviors of the plurality of parties, sensor data from the vehicles, and others. The initial information set 310 and the secondary information set 320 can then be forwarded to the comparison module 230 to prepare a comparison 325.

The comparison module 230 can then create the comparison 325 of the initial information set 310 and the secondary information sets 320 to determine the level of correlation between the sets. The comparison 325 can include qualitative or quantitative level of agreement between the initial information set 310 and the secondary information sets 320, including descriptions of the event, locations of the events, locations of the parties, types of events, reported timing, sensor data, remedial information, and others. The comparison 325 can be cumulative or individualized for one or more of the data points within the initial information set 310 and the secondary information sets 320.

The comparison module 230 can then apply the comparison 325 to the initial report 305 and the secondary reports 315 to create a reliability factor 330. The reliability factor 330 is an index of how much the initial report 305 can be trusted based on the secondary reports 315. The reliability factor 330 can include both the current expected validity of the information, as weighted with other known information from a variety of sources, such as news, internet searches, likelihood of "gaming the system", and others. "Gaming the system" is defined as manipulation of the system such that unearned or undeserved compensation is given to at least one or the plurality of parties. Gaming the system can include false corroboration of false reports, false repots intended to reduce a party's reputation or virtual currency, or others. The reliability factor 330 can include reliability of the information as determined by a number of factors include the comparison 325, the reputation of the plurality of parties, activity of the plurality of parties, degrees of relation of the plurality of parties, and other.

The reliability factor 330 can then be forwarded to the compensation module 240, where compensation 335 can be distributed to the initial party and the secondary parties based on the weight of their respective contributions. The compensation 335 can include a variety of compensations types, including virtual currency, reputation, and others. The compensation, such as the virtual currency, can be stored in a data store, such as the memory 214 or the database 210. Reputation can be collected and stored in the same fashion as the virtual currency, such that the initial party and the secondary parties can view their reputation and access rewards based on said reputation. The compensation 335 can be displayed to the initial party or the secondary parties using a display, such as the display device 132 or the AR system 180. Currency or reputation acquired from the compensation 335 can be used via the display in the vehicle 100, a computing device connected to server 192 through a network 190, or others.

Thus, the information corroboration system 170 can provide numerous benefits to the detecting party, the corroborating party and to the public as a whole. The information corroboration system 170 incentivizes both involvement and engagement in the driving experience. Further, the information corroboration system 170 helps deter negative reporting by having a commensurate compensation for untruthful reports.

Figure 4B:
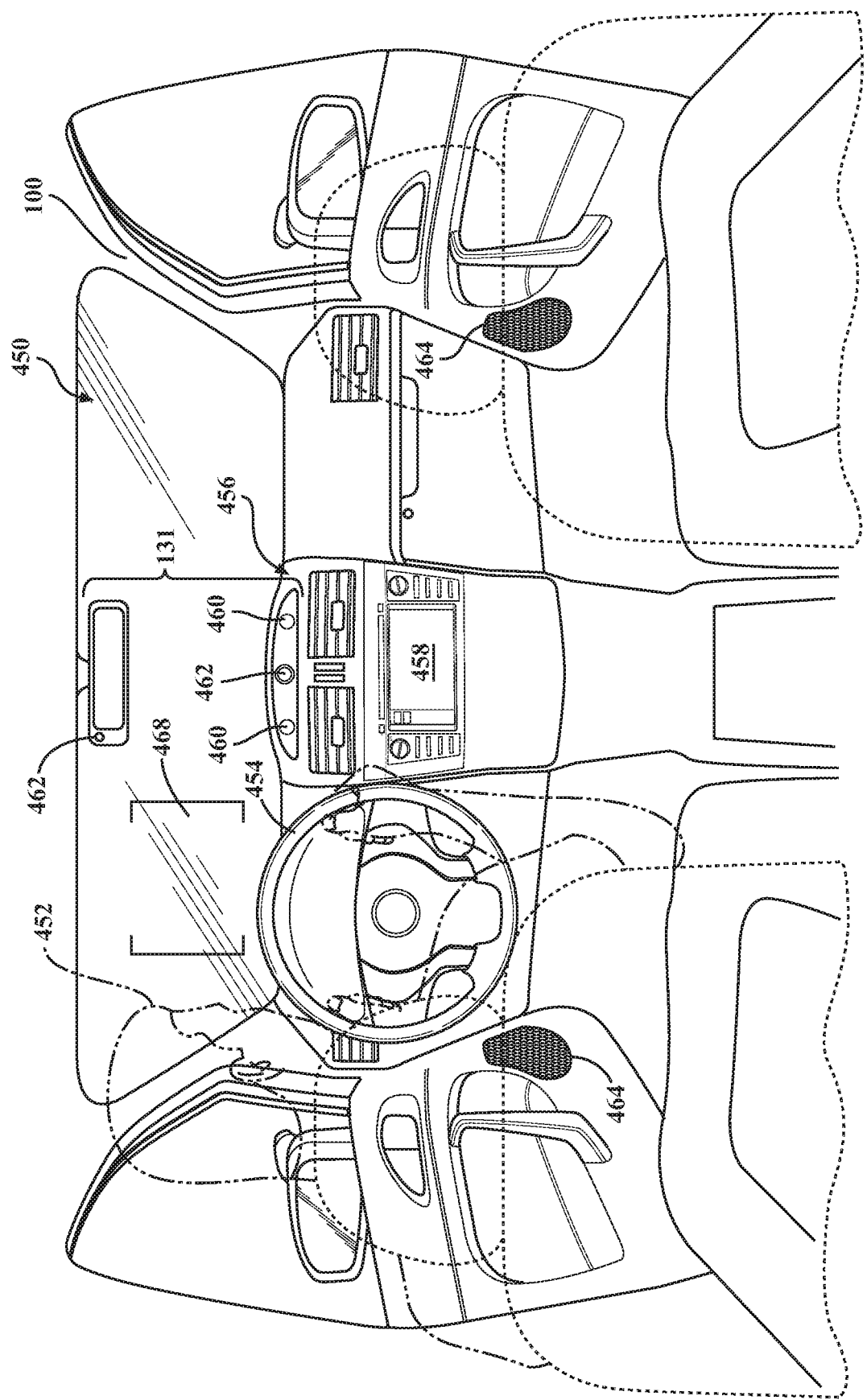

FIGS. 4A and 4B depict one or more vehicles incorporating the information corroboration system 170, according to embodiments described herein. The plurality of vehicles, depicted as vehicles 402, 404, 406, 408, and 410, are depicted in an environment 400. Each of the vehicles 402, 404, 406, 408, and 410 can be equipped with the information corroboration system 170, as described with reference to FIGS. 2 and 3, and a sensor system 430. The sensor system 430 can include one or more external environmental sensors, such as image capture devices, RADAR, LIDAR, and others. In one embodiment, the sensor system 430 is substantially similar to the sensor system 120, described with reference to FIG. 1. In this example, the vehicles 402, 404, 406, 408, and 410 are on a first road 412. The first road 412 can have a detectable event 420, shown here as a rockslide, where vehicles 402, 404, 406 have approached the detectable event.

FIG. 4B depicts an exemplary passenger compartment 450 for the vehicles 402, 404, 406, 408, and 410. The passenger compartment 450 can include a variety of vehicle-appropriate components, including a steering wheel 454, and a dashboard 456. The passenger compartment 450 can further include the communication system 131, depicted here as including a display (such as a screen display 458 or an augmented reality display 468), a microphone 460, an image capture device 462, and one or more speakers 464. The information corroboration system 170 can begin with instructions from the collection module 220, after the detectable event 420 is detected. In this example, the detectable event 420 can be detected by the vehicle 100 as an "unknown obstacle" using the sensor system 430. Further, the detectable event 420 can be detected by the vehicle operators/passengers 452 (e.g., the initial party and/or the secondary party). By either prompt from the collection module 220 or impromptu from the vehicle operators/passengers 452, the vehicle operators/passengers 452 can then make a report to the collection module 220 through the communication system 131. In this embodiment, the collection module 220 then determines the initial party and the secondary party based on the timing of their report, with the earliest report being treated as the initial report. As used herein, the vehicles 402, 404, 406, 408, and 410 or the vehicle operators/passengers 452 may be described as providing information to the information corroboration system 170. However, it is understood that the vehicle operator/passenger 452 of the respective vehicle, of the vehicles 402, 404, 406, 408, and 410, is providing the report.

The vehicles 402, 404, and 406 provide a report to the collection module 220 using the communication system 131. In this example, vehicle 402 provides the initial report 305 and vehicles 404 and 406 provide the secondary reports 315. The initial report 305 can be given through a number of input methods, including verbally, typed, via selection from a list, or others. The vehicle operators/passengers 452 for each of the vehicles 402, 404, and 406 can provide information on the nature of the detectable event 420 (a rockslide on the first road 412), the conditions of the event (e.g., clear weather and three cars are backed up on the first road 412), remedial measures being taken (e.g., 911 has been called, but no emergency vehicles have arrived), or other issues as deemed appropriate or requested.

The collection module 220 can then, through instructions to a processor, such as the processor 110, create an initial information set 310 and a secondary information set 320 from the initial report 305 and the secondary reports 315, respectively. The initial information set 310 and the secondary information sets 320 remove personal style from the data analysis, such as nomenclature or stylistic differences when describing the same object (e.g., "bunch of rocks . . . " as opposed to "rockslide"). The initial information set 310 and the secondary information sets 320 include specific data point about the rockslide, remedial measures available for said detectable event, timing of the report, location of the vehicle operators/passengers 452 when the report was given, sensor data taken by the sensor system 430, and other as derived from the initial report 305 and the secondary reports 315. The initial information set 310 and the secondary information set 320 can then be stored in a data store, such as the database 210, described with reference to FIG. 2.

The comparison module 230 can then, through instructions executed by the processor, compare the initial information set 310 and the secondary information sets 320. The initial information set 310 and the secondary information sets 320 can either be forwarded from the collection module 220 or accessed by comparison module 230. The comparison 325 in the example shown here, can be numerical indicators of correspondence between the sets. The comparison 325 can include substantial similarity between the initial information set 310 and the secondary information sets 320, as reported by the vehicles 402, 404, and 406. Further, the comparison 325 can note the correlation of the data from the sensor system 430 with the initial information set 310 and the secondary information set 320. Thus, the initial information set 310 derived from the initial report 305 from vehicle 402 corresponds with the secondary information sets 320 derived from the secondary reports 315 from vehicle 404 and 406.

The comparison 325 can then be applied by the comparison module 230 to create the reliability factor 330. The reliability factor 330, as described above, is an indicator of the reliability of the present report. The reliability factor 330 can consider both the current data (e.g., the reports and the information sets) and the history of the vehicle operators/passengers 452, in determining if the initial report 305 and the secondary reports 315 are reliable. In this example, vehicle 402 has a high reputation from numerous reports, vehicle 404 has a neutral reputation from no prior reporting, and vehicle 406 has a low reputation from having presented false information numerous times in the past. Thus, the reliability factor 330 of the initial report 305 is high, based on the corroboration, and the reputation of all parties involved. Other forms of compensation 335 can be used in a similar fashion to weight the corroboration of the information sets accordingly. As such, vehicle 402 requires less corroboration to be trusted. The corroboration from vehicle 404 is treated at a standard level of impact on corroboration. The corroboration from vehicle 406 has significantly less impact than vehicle 404, but still serves to validate the report from vehicle 402, as vehicle 402 has a high reputation. The corroborated initial report 305 can then be forwarded to other vehicles, such as vehicle 408 and vehicle 410, such that they can divert to a side road 414 and avoid the rockslide (the detectable event 420).

The reliability factor 330 can then be forwarded to the compensation module 240. The compensation module 240, through instructions to the processor, provides compensation 335 to the initial party and the secondary parties. As stated previously, the vehicles 402, 404, and 406 can have tiered compensation based on factors such as timing or level of involvement. The vehicle 402, being the first vehicle to report the detectable event 420 and the vehicle with the highest reputation, can receive a higher compensation than the vehicle 404 and the vehicle 406. In this example, the compensation includes both virtual currency and reputation. Both the virtual currency and the reputation can be used for purchases, as described above with reference to FIGS. 2 and 3. Of note, if the vehicle 402 had provided information through the initial report 305 that was determined to not be reliable, the vehicle 402 may have been given negative reputation and/or no virtual currency as compensation 335. In this event, the secondary parties would receive compensation 335 for their secondary reports 315 and/or the one of the secondary parties could be selected as a new initial party (subject to the same benefits as described above).

Figure 5:
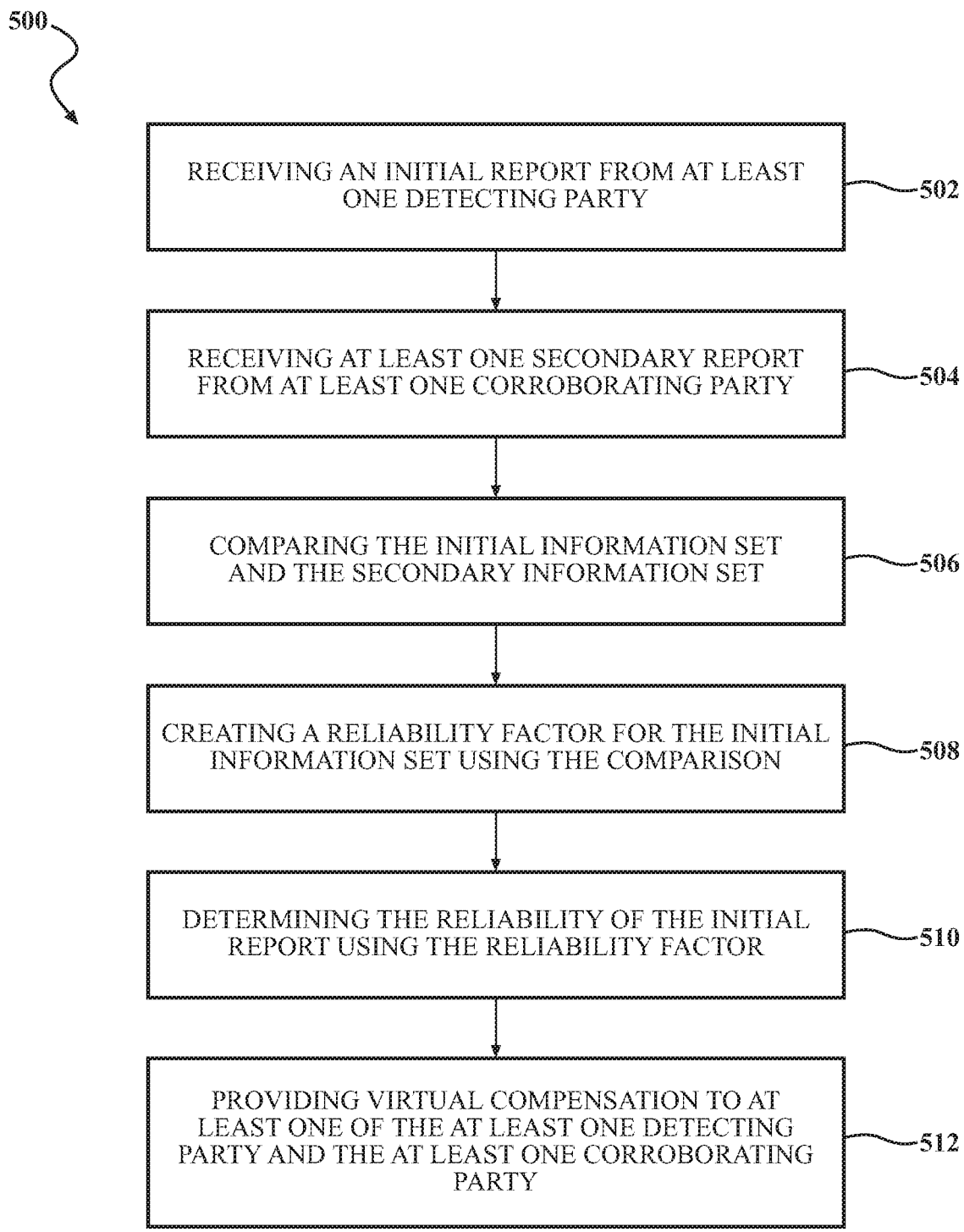
FIG. 5 is a flow diagram of a method for collecting and assessing party-generated information, according to one or more embodiments.

FIG. 5 is a flow diagram of a method 500 for collecting and assessing party-generated information, according to one or more embodiments. The method described herein includes receiving input from an initial party and one or more secondary parties. The input from each party is corroborated against the other parties. Then, the reliability of the input is determined and the parties are compensated based on reliability, such as if the information is determined to be reliable. The method 500 can include receiving an initial report from at least one detecting party, the initial report providing an initial information set for a detectable event, at 502. A secondary report can then be received from at least one corroborating party, the secondary report providing at least one secondary information set for the detectable event, at 504. The initial information set and the secondary information set can then be compared, at 506. A reliability factor can then be created for the initial information set using the comparison, at 508. The reliability of the initial information set can then be determined using the reliability factor, at 510. Finally, virtual compensation can be provided to at least one of the at least one detecting party and the at least one corroborating party, when the initial information set is determined to be reliable, at 512.

The method 500 can begin by receiving an initial report from at least one detecting party, the initial report providing an initial information set for a detectable event, at 502. The initial report is a report of information from the detecting party about the detectable event. The detectable event is an event or occurrence which the detecting party determines is of interest. The initial report can include an initial information set for a detectable event, including information on the detectable event. The initial information set is information provided regarding the detectable event, which is derived from the initial report. The initial information set can include location, description of the event, what makes the event notable, guidance for other operators, navigational information, and further details to discern the detectable event. In one embodiment, the initial information set can include the approximate position on a road that an event occurred, the type of event, the timing of the event, and remedial actions being taken.

In one or more embodiments, the receiving of the initial report can be included as part of a system, such as the information corroboration system 170 described with reference to FIG. 2. The information corroboration system 170 can include the collection module 220. The collection module 220 can include instructions to receive an initial report from a detecting party. The initial information set can be stored as part of the detection information 260. The detection information 260 can be stored in a database, such as a database 210.

A secondary report can then be received from at least one corroborating party, the secondary report providing at least one secondary information set for the detectable event, at 504. The corroborating party can be one or more users or operators. The corroborating party can provide information which corroborates the initial information set. The secondary report is a description of the detectable event which provides additional information about the detectable event, which can include a secondary information set for the detectable event. The secondary information set can be used to corroborate or deny at least a portion of the initial information set. The determination of which report is the initial report and which reports become a secondary report can be decided based on timing, reputation, expertise (e.g., certain detectable events can require a specific skill level to be considered an initial detection, such as failing infrastructure), or other factors. In one or more embodiments, the receiving of the secondary report can be included as part of a system, such as the information corroboration system 170 described with reference to FIG. 2. The information corroboration system 170, including the collection module 220, can further include instructions to receive at least one secondary report from at least one corroborating party. The secondary report can be used to produce the secondary information set. The secondary information set can be stored as part of the detection information 260 in a database, such as a database 210.

The initial information set and the secondary information set can then be compared, at 506. The initial information set and the secondary information set are compared to determine the level of correlation between said information sets. As above, the initial information set is expected to correlate at a number of factual locations with the secondary information set. As such, by collecting one or more secondary information sets with the initial information set, the initial information set can be verified in real time. The comparison can include qualitative measurements (e.g., the initial information set is generally accurate) and quantitative measurements (e.g., a percentile of accuracy based on a number of verification points). In further embodiments, the method 500 can compare secondary information sets to one another. In cases of multiple secondary information sets, the secondary information sets can be compared internally to determine if there is outlying data. In this way, the unreliable secondary information sets can be removed to prevent false negatives regarding the initial information set. In one or more embodiments, the comparison can be performed as part of a system, such as the information corroboration system 170 described with reference to FIG. 2. The information corroboration system 170, including the comparison module 230, can include instructions to receive the initial information set and the secondary information set, as forwarded from the collection module 220. The comparison module 230 can further include instructions to compare the initial information set and the secondary information set, through execution by the processor 110.

A reliability factor can then be created for the initial information set using the comparison, at 508. The reliability factor is the measure of how reliable the initial information set is, based on the comparison between the initial information set and the secondary information set. The reliability factor can be a quantitative or qualitative measure, which can make the reliability factor of a specific information set more comprehensible. In one embodiment, the reliability factor and/or the comparison can be part of a set of data referred to as reliability information. In one example, the reliability factor is a quantitative measure which is an integer between 1 and 100, where higher integers indicate higher reliability of the information set and/or the detecting party. The reliability information can be a collection of information regarding the one or more information sets generally, regarding the reliability of one or more detecting parties and/or corroborating parties, or other information relating to reliability. In one or more embodiments, the reliability factors can be determined as part of a system, such as the information corroboration system 170 described with reference to FIG. 2. The comparison module 230 can include instructions to create a reliability factor for the initial information set using the comparison. In one embodiment, the reliability factor and/or the comparison can be stored as part of the reliability information 270. The comparison, the reliability factor and the reliability information 270 can be stored in a data store, such as the database 210.

The reliability of the initial information set can then be determined using the reliability factor, at 510. The reliability factor generally relates to how much the detecting party and/or the current information set from the detecting party can be trusted. Thus, the reliability factor regarding the initial information set can be applied to the initial report to determine reliability of the information as provided by the detecting party. The reliability factor can be directed to an individual detectable event (e.g., the detecting party provided an initial report which is reliable to some degree as determined from the comparison), cumulative (e.g., based on a number of reports, the detecting party provides information which is reliable to some degree), or combinations thereof. As above, the method 500 can determine the reliability of the initial report, the secondary reports, or combinations thereof. In the event that enough secondary reports have been received, other secondary reports can be used to determine if one of the secondary reports is providing poor or false information. The secondary information sets from said secondary report and the other secondary reports can be provided a reliability factor. The secondary reliability factors can then be used to determine the reliability of the secondary reports and the weight they are given against the initial report. In one or more embodiments, the reliability factors can be applied as part of a system, such as the information corroboration system 170 described with reference to FIG. 2. The information corroboration system 170, including the comparison module 230, can include instructions to determine the reliability of the initial information set using the reliability factor.

Finally, virtual compensation can be provided to at least one of the at least one detecting party and the at least one corroborating party, when the initial information set is determined to be reliable, at 512. Using the established reliability regarding the initial report and/or the secondary reports, the detecting party and/or the corroborating party can be compensated based on their accuracy. The compensation can be any form of compensation, respective to the value of the information provided. Compensations can include real or virtual currency, reputation, tokens, gifts, tickets, or others. The compensation can include more than one form of compensation, such as both virtual currency and reputation. Reputation is used here to describe the weight that your contributions (either detecting party or corroborating party) will have in the future. In the case of virtual currency, the currency can be used for a variety of benefits such as advance information, upgrades to their vehicle, online game benefits, or others.

As described above, the compensation can be tiered (e.g., more for one party than another), of different forms for each party (e.g., the detecting party receives reputation and actual currency, whereas the corroborating parties receive virtual currency), positive/negative, or combinations thereof. The compensation can reflect whether the information from the initial or secondary report was either deceptive or truthful. Compensation for positive contributions can generally benefit the contributing party (either detecting party or corroborating party). However, compensation for negative contributions can have a negative effect. In further embodiments, the virtual currency can be used to purchase guidance information for your vehicle. One skilled in the art will understand that there are a variety of compensations schemes which can be modified for or used with disclosed system and methods. The method 500 can further include using the collected virtual currency for purchasing. The method 500 can include communicating with the detecting party or secondary party and then present a list or display of articles which can be purchased using the compensation. As such, information regarding compensations and purchases can be collected over time, such that a model can be created. In the case of virtual currency, the purchase information can be used to determine which forms of compensation are sought after by different demographics or overall.

In one or more embodiments, the compensation can be provided as part of a system, such as the information corroboration system 170 described with reference to FIG. 2. The information corroboration system 170, including the compensation module 240, can include instructions for receiving and for exchanging a currency, such as exchanging a currency for information or items of value. Using the established reliability regarding the initial report and/or the secondary reports, the compensation module 240 can compensate the detecting party and/or the corroborating party based on their accuracy. The compensation module 240 can include an interface to communicate with the detecting party or secondary party, such as through the communication system 131 or the AR system 180, to allow purchase of various items using said virtual currency.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing devices to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous driving module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle can further include a communication system 131. The communication system 131 can be include a display device 132, audio devices 133 (e.g., speakers and microphones), and one or more input devices 134. The one or more input devices can include sensors, such as cameras, infrared devices, biometric devices, or others. The input devices 134 can further include a touch screen or manual buttons. The communications system can be in communication with the information corroboration system 170, either locally or remotely, such as through a network 190. The communication system 131 can be connected with the vehicle permanently or semi-permanently. Further, the communication system 131 can be divided into components, with portions thereof being permanently part of the vehicle 100, while other components of the communication system 131 can be removed.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the information corroboration system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the information corroboration system 170, and/or the autonomous driving module(s) 160 may control some or all of these vehicle systems 140 and, thus, may be partially or fully autonomous.

The processor(s) 110, the information corroboration system 170, and/or the autonomous driving module(s) 160 can be operably connected to communicate with the various vehicle systems 140 and/or individual components thereof. For example, returning to FIG. 1, the processor(s) 110, the information corroboration system 170, and/or the autonomous driving module(s) 160 can be in communication to send and/or receive information from the various vehicle systems 140 to control the movement, speed, maneuvering, heading, direction, etc. of the vehicle 100. The processor(s) 110, the information corroboration system 170, and/or the autonomous driving module(s) 160 may control some or all of these vehicle systems 140.

The processor(s) 110, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, and/or the autonomous driving module(s) 160 can control the direction and/or speed of the vehicle 100. The processor(s) 110, and the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data. The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source.

It should be appreciated that the AR system 180 can take many different forms but in general functions to augment or otherwise supplement viewing of objects within a real-world environment surrounding the vehicle. That is, for example, the AR system 180 can overlay graphics using one or more AR displays in order to provide for an appearance that the graphics are integrated with the real-world through, for example, the windshield of the vehicle 100. Thus, the AR system 180 can include displays integrated with the windshield, side windows, rear windows, mirrors and other aspects of the vehicle 100. In further aspects, the AR system 180 can include head-mounted displays such as goggles or glasses. In either case, the AR system 180 functions to render graphical elements that are in addition to objects in the real-world, modifications of objects in the real-world, and/or a combination of the two. In one embodiment, at least one AR display of the AR system 180 fuses a real-time image from a camera (e.g., exterior facing camera) of at least part of the surroundings of the vehicle 100 with synthetic objects (e.g., rendered graphical elements) from the AR system 180 and/or the information corroboration system 170. As one example, a monitor (i.e., AR display) is integrated within or just above a dashboard of the vehicle 100 and is controlled to display a fused view of graphical elements rendered by the AR system 180 with real-world images from the camera. In this way, the AR system 180 can augment or otherwise modify a view of an operator/passenger in order to provide an enriched/embellished visual sensory experience. The noted functions and methods will become more apparent with a further discussion of the figures.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which comprises one or more executable instructions for implementing the specified logical function(s). It should also be noted that, in some alternative embodiments, the functions noted in the block can occur out of the order noted in the Figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. An information corroboration system for collecting and assessing information, comprising:
   one or more processors; and
   a memory communicably coupled to the one or more processors and storing:
   a collection module including instructions that when executed by the one or more processors cause the one or more processors to receive an initial report from at least one detecting party, the initial report providing an initial information set for a detectable event, and to receive at least one secondary report from at least one corroborating party, the at least one secondary report providing at least one secondary information set for the detectable event;
   a comparison module including instructions that when executed by the one or more processors cause the one or more processors to compare the initial information set and the at least one secondary information set, to create a reliability factor for the initial information set using the comparison, and to determine a reliability of the initial report using the reliability factor; and
   a compensation module including instructions that when executed by the one or more processors cause the one or more processors to:
     provide virtual compensation to at least one of the at least one detecting party and the at least one corroborating party, when the initial report is determined to be reliable, the virtual compensation including virtual money, whereby the virtual money is usable to purchase various items; and
     provide negative virtual currency to at least one of the at least one detecting party and the at least one corroborating party when the initial report is determined to be unreliable, the negative virtual currency including deducting virtual money.

2. The information corroboration system of claim 1, wherein the collection module further includes instructions to provide a prompt indicating a possible detectable event to the at least one detecting party.

3. The information corroboration system of claim 1, wherein the at least one secondary report comprises a plurality of secondary reports, and wherein the comparison module further includes instructions to create a reliability factor for the at least one secondary information set.

4. The information corroboration system of claim 3, wherein the comparison module further includes instructions to determine a reliability of the at least one secondary report.

5. The information corroboration system of claim 4, wherein the compensation module further includes instructions to provide negative virtual currency and reduced comparative reliability, when the at least one secondary report is determined to be unreliable.

6. The information corroboration system of claim 1, wherein the virtual compensation includes reputation.

7. The information corroboration system of claim 1, wherein the compensation module further includes instructions to provide an interface to the at least one detecting party or the at least one corroborating party allowing the purchase of various items using the virtual money.

8. The information corroboration system of claim 1, wherein the negative virtual currency further includes negative reputation.

9. A non-transitory computer-readable medium for collecting and assessing information and storing instructions that when executed by one or more processors cause the one or more processors to:
receive an initial report from at least one detecting party, the at least one initial report providing an initial information set for a detectable event;
receive at least one secondary report from at least one corroborating party, the at least one secondary report providing at least one secondary information set for the detectable event;
compare the initial information set and the at least one secondary information set;
create a reliability factor for the initial information set using the comparison;
determine a reliability of the initial report using the reliability factor; and
provide virtual compensation to at least one of the at least one detecting party and the at least one corroborating party, when the initial report is determined to be reliable, the virtual compensation including virtual money, whereby the virtual money is usable to purchase various items; and
provide negative virtual currency to at least one of the at least one detecting party and the at least one corroborating party when the initial report is determined to be unreliable, the negative virtual currency including deducting virtual money.

10. The non-transitory computer-readable medium of claim 9, further including instructions to provide a prompt indicating a possible detectable event to the at least one detecting party.

11. The non-transitory computer-readable medium of claim 9, wherein the at least one secondary report comprises a plurality of secondary reports, and further including instructions to create a reliability factor for the at least one secondary information set.

12. The non-transitory computer-readable medium of claim 11, further including instructions to determine a reliability of the at least one secondary report.

13. The non-transitory computer-readable medium of claim 12, further including instructions to provide negative virtual currency and reduced comparative reliability, when the at least one secondary report is determined to be unreliable.

14. The non-transitory computer-readable medium of claim 9, further including instructions to provide an interface to the at least one detecting party or the at least one corroborating party allowing the purchase of various items using the virtual money.

15. The non-transitory computer-readable medium of claim 9, wherein the negative virtual currency further includes negative reputation.

16. A method for collecting and assessing information, comprising:
receiving an initial report from at least one detecting party, the initial report providing an initial information set for a detectable event;
receiving at least one secondary report from at least one corroborating party, the at least one secondary report providing at least one secondary information set for the detectable event;
comparing the initial information set and the at least one secondary information set;
creating a reliability factor for the initial information set using the comparison;
determining a reliability of the initial report using the reliability factor; and
providing virtual compensation to at least one of the at least one detecting party and the at least one corroborating party, when the initial report is determined to be reliable, the virtual compensation including virtual money, whereby the virtual money is usable to purchase various items; and
providing negative virtual currency to at least one of the at least one detecting party and the at least one corroborating party when the initial report is determined to be unreliable, the negative virtual currency including deducting virtual money.

17. The method of claim 16, wherein the at least one secondary report comprises a plurality of secondary reports, and further comprising creating a reliability factor for the at least one secondary information set.

18. The method of claim 17, further including determining a reliability of the at least one secondary report, and providing negative virtual currency and reduced comparative reliability, when the at least one secondary report is determined to be unreliable.

19. The method of claim 16, further including providing an interface to the at least one detecting party or the at least one corroborating party allowing the purchase of various items using the virtual money.

20. The method of claim 16, wherein the negative virtual currency further includes negative reputation.

* * * * *

UNITED STATES PATENT AND TRADEMARK OFFICE
CERTIFICATE OF CORRECTION

PATENT NO. : 10,911,542 B2
APPLICATION NO. : 15/936674
DATED : February 2, 2021
INVENTOR(S) : Matthew Amacker, Julian M. Mason and Nikolaos Michalakis Page 1 of 1

It is certified that error appears in the above-identified patent and that said Letters Patent is hereby corrected as shown below:

In the Specification

Column 8, Lines 14-15: delete "secondary parties respectively." and insert --secondary parties, respectively.--

Column 9, Line 2: delete "repots" and insert --reports--

In the Claims

Claim 9, Column 23, Line 30: delete "the at least one initial report" and insert --the initial report--

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*